(12) United States Patent
Funakoshi (10) Patent No.: US 8,098,307 B2
(45) Date of Patent: Jan. 17, 2012

(54) IMAGING DEVICE AND IMAGING METHOD (75) Inventor: Jun Funakoshi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 901 days.

(21) Appl. No.: 12/130,617

(22) Filed: May 30, 2008

(65) Prior Publication Data

US 2008/0297630 A1    Dec. 4, 2008

(30) Foreign Application Priority Data

May 31, 2007  (JP) ................................. 2007-144332

(51) Int. Cl.
*H04N 9/64* (2006.01)
(52) U.S. Cl. .................. 348/251; 348/E5.034
(58) Field of Classification Search .................. 348/251, 348/E5.034
See application file for complete search history.

(56) References Cited

U.S. PATENT DOCUMENTS 6,614,282 B2    9/2003    Abe et al.
7,750,955 B2 *  7/2010    Shirai et al. ................... 348/243

FOREIGN PATENT DOCUMENTS

| JP | 2000-152031 | 5/2000 |
| JP | 2002-281343 | 9/2002 |
| JP | 2003-124811 | 4/2003 |

* cited by examiner

*Primary Examiner* — William Choi
(74) *Attorney, Agent, or Firm* — Arent Fox LLP

(57) ABSTRACT

According to an aspect of an embodiment, an imaging device has a black level reference generator for generating a reference value of a black level by calculating an average value of the accumulated pixel values for which the maximum values and/or minimum values has been replaced by the compensational pixel values, and an output compensator for compensating an output from the light sensitive pixels with the reference value of the black level.

12 Claims, 5 Drawing Sheets

IMAGING DEVICE AND IMAGING METHOD

CROSS-REFERENCE TO RELATED APPLICATION

This application is based upon and claims the benefit of priority of the prior Japanese Patent Application No. 2007-144332 filed on May 31, 2007, the entire contents of which are incorporated herein by reference.

BACKGROUND

This present technique relates to an imaging device and an imaging method, which may include an imaging device having a solid state imaging element and an imaging method for processing an output signal of a solid state imaging element.

In a solidstate imaging element such as a CMOS (Complementary Metal-Oxide Semiconductor) image sensor or the like, a black pixel (light shielded pixel) is prepared for a pixel array, and adjustment of a black level (black clamp) is performed (for example, see Japanese Patent No. 3808349, Japanese Patent No. 3670145, Japanese Patent No. 3797186).

For the black clamp, a value in which multiple pixels are subjected to average processing for every line is generally used. In a process of the average processing, mixing of a black pixel having a too large or too small value than that of other pixels causes occurrence of a horizontal stripe noise or the like. In order to reduce the noise for improvement, many black pixels are prepared.

In order to obtain a stable average value by the average processing, a lot of black pixels are required. However, when a lot of black pixels are prepared for one line, the chip area of an image sensor is increased (since pixels are aligned in a matrix manner, when the number of pixels are increased in the horizontal direction, there is an influence (impact) to the pixel area due to the multiplication in the vertical direction).

SUMMARY

According to an aspect of an embodiment, an imaging device has a black level reference generator for generating a reference value of a black level by calculating an average value of the accumulated pixel values for which maximum values and/or minimum values has been replaced by the compensational pixel values, and an output compensator for compensating an output from the light sensitive pixels with the reference value of the black level. These together with other aspects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Hereinafter, an embodiment will be described with referee to the accompanying drawings.

First, the outline of the embodiment will be described, and then, the embodiment will be described.

Figure 1:
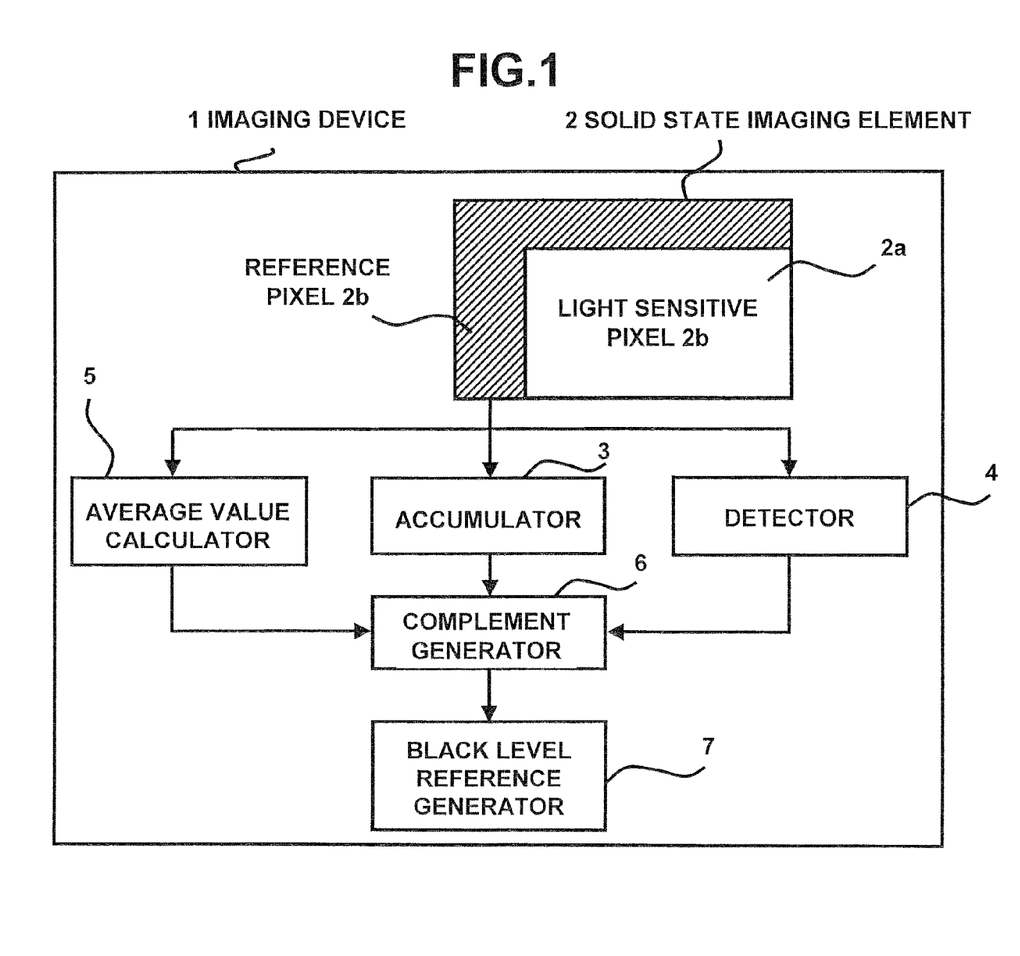
FIG. 1 is a diagram showing an outline of an embodiment.

FIG. 1 is a diagram showing the outline of the embodiment.

An imaging device 1 includes a solidstate imaging element 2, an accumulator 3, a detector 4, an average value calculator 5, a generator 6, and a black level reference generator 7.

The solidstate imaging element 2 is equipped with (a plurality of) light sensitive pixels 2a for detecting light and (a plurality of) reference pixels 2b shielded from light.

The accumulator 3 accumulates pixel values of the reference pixels 2b to be input. The unit of the reference pixels to be input is not specifically limited, and for example, one row unit.

The detector 4 detects a maximum value and/or a minimum value from the input pixel values of the reference pixels 2b.

The average value calculator 5 calculates an average value from pixel values of a predetermined number of the reference pixels 2b.

Likewise, an average value from pixel values of a difference of reference pixels may be the compensational pixel value, and the difference of the reference pixels may be provided by subtracting powers of two of the reference pixels from a predetermined number of the reference pixels. The powers of two of the reference pixels may include the maximum values and/or minimum values of the pixel values of the predetermined number of reference pixels.

The substitutional value generator 6 performs a complement process for removing the maximum value and/or the minimum value detected by the detector 4 from accumulated pixel values accumulated by the accumulator 3 and the removed pixel values with the average value calculated by the average value calculator 5.

The black level reference generator 7 creates a reference value of a black level from an accumulation value subjected to a process by the substitutional value generator 6. Specifically, the average value of the accumulation value is set to the reference value of the black level.

According to the imaging device 1, pixel values of the reference pixels 2b to be input are accumulated by the accumulator 3. The maximum value and/or the minimum value are/is detected by the detector 4. An average value is calculated from pixel values of a predetermined number of the reference pixels 2b by the average calculator 5. The maximum value and/or the minimum value detected by the detector 4 are/is removed from an accumulated pixel values accumulated by the accumulator 3 and the removed pixel values are the average value calculated by the average value calculator 5 by the substitutional value generator 6. A reference value of a black level is created by the black level reference generator 7 from an accumulation value subjected to a process by the substitutional value generator 6.

Hereinafter, the embodiment will be described.

Figure 2:
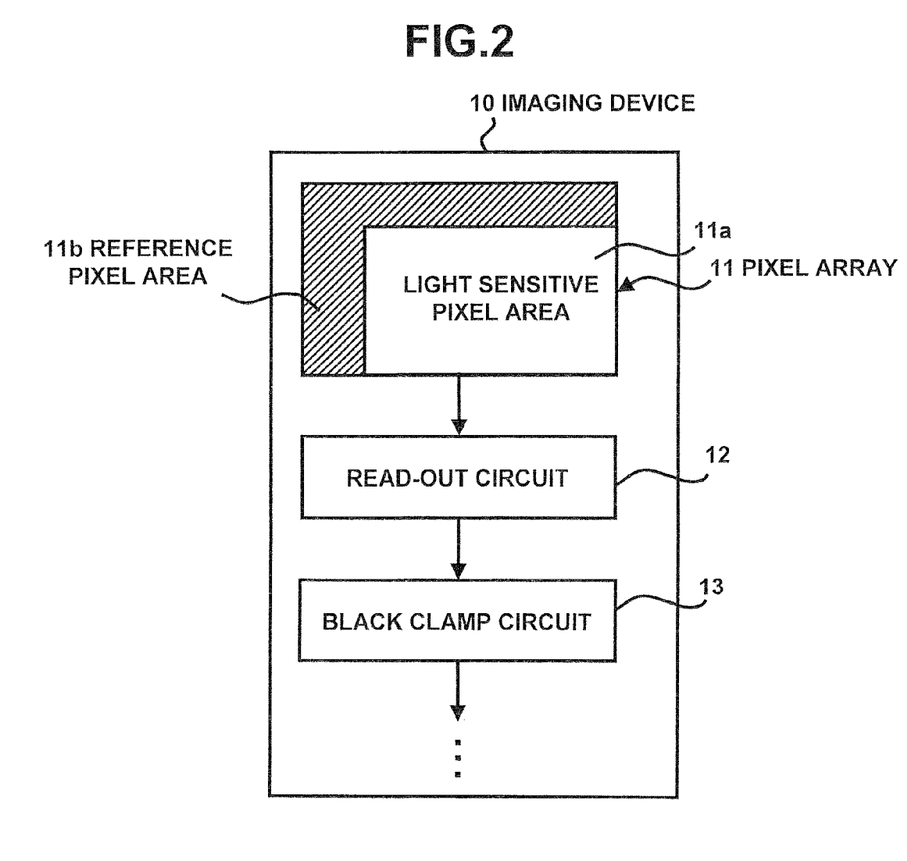
FIG. 2 is a block diagram showing an imaging device of an embodiment.

FIG. 2 is a block diagram showing an imaging device of the embodiment.

The imaging device 10 includes a pixel array 11, a read-out circuit 12, and a black clamp circuit 13.

The pixel array 11 includes a light sensitive pixel area 11a in which a plurality of light sensitive pixels is arranged in a matrix manner and a reference pixel area 11b (shaded area in FIG. 2) formed by a plurality of reference pixels shielded from light. A pixel signal read out from the reference pixel is used for removing an offset caused by the dark current component from pixel signals of the light sensitive pixels. Herein, the reference pixel area 11b is disposed to form one side of the horizontal line (row) and vertical line (column).

The read-out circuit 12 reads out an image signal of light sensitive pixel area 11a and the reference pixel area 11b from the pixel array 11 for every one horizontal line. Then, the read-out circuit 12 obtains a pixel value (quantized value) of a reference pixel by subjecting the read out image signal to AD conversion processing.

The black clamp circuit 13 is a circuit to keep a black level to a constant value with respect to a temperature change of the pixel array 11, and creates a reference value of a black level by using each input pixel value in the reference pixel area 11b. Herewith, an increased amount of the dark current generated by increase of temperature or the like may be canceled.

Figure 3:
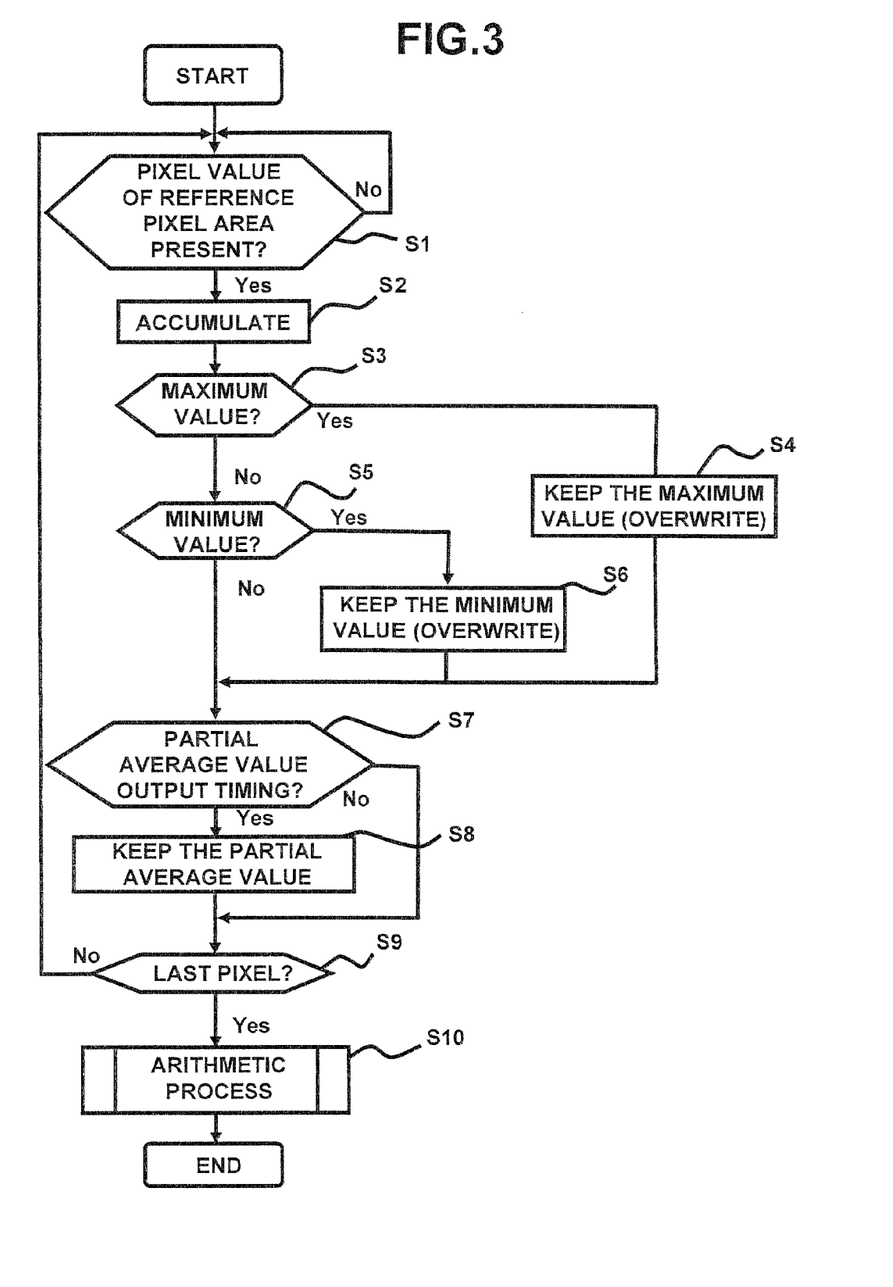
FIG. 3 is a flow chart showing a creation process of a reference value of a black level performed by a black clamp circuit.

Next, a creation process of a reference value of a black level performed by the black clamp circuit 13 will be described.

FIG. 3 is a flow chart showing a creation process of a reference value of a black level performed by the black clamp circuit 13.

First, whether the input pixel value is a pixel value of the process target or not, that is, a pixel value of the reference pixel area 11b or not is judged (step S1). The judgment may be performed based on, for example, a timing signal or the like provided by a timing generator (not shown) equipped in the imaging device 10.

When the pixel value is not a pixel value of the process target (No in step S1), the black clamp circuit 13 waits that a pixel value of the process target is input.

When the pixel value is a pixel value of the process target (Yes in step S1), the black clamp circuit 13 accumulates the pixel value to the previously input pixel value (step S2).

Then, whether the pixel value input this time is the most large value among the pixel values input in the past or not (whether the maximum value or not) is judged by comparing the pixel value of the process target input this time with the value kept in the black clamp circuit 13 (step S3). Specifically, when the input value is the primarily input value, the input pixel value is compared with a starting value preliminarily prepared for regulating the black level or the minimum value zero. When the input value is not the primarily input value (the pixel value which is input after the primarily input pixel value), the input pixel value is compared with the pixel value input in the past kept in the black clamp circuit 13 and whether the input pixel value is the maximum value or not is judged.

Then, when the input value is not the maximum value (No in step S3), the process goes to step S5. On the other hand, when the input value is the maximum value (Yes in step S3), the value is kept (overwritten) (in step S4), and the process goes to step S7. The kept pixel value becomes the pixel value compared with the pixel value input in the following in step S3.

Next, whether the input pixel value is the minimum value or not is judged (step S5). Specifically, when the input pixel value is the primarily input value, the input pixel value is compared with a preliminarily prepared starting value regulating the black level (may be the same value and may be not the same value as in step S3) or the maximum value (for example, 1023 in the case of 10 bit, or the like). When the input value is not the primarily input pixel value, (the pixel value which is input after the primarily input pixel value) the input pixel value is compared with the pixel value input in the past kept by the black clamp circuit 13 and whether the input value is the minimum value or not is judged.

Then, when the input value is not the minimum value, (No in step S5), the process goes to step S7. On the other hand, when the input value is the minimum value (Yes in step S5), the value is kept (overwritten) (in step S6), and the process goes to step S7. The kept pixel value becomes the pixel value compared with the pixel value input in the following in step S5.

Note that the order of the processes of steps S2 to S6 may be changed or the processes may be performed in parallel.

Next, whether it is partial average value output timing showing the timing for obtaining the average value of the accumulated pixel values input in the past or not is judged (step S7). The judgment may be also performed based on, for example, a timing signal or the like provided by a timing generator. Further, it is preferable that the timing is set when the accumulated number of the input pixel values becomes a power-of-two (for example, four, eight, or the like).

When it is not the partial average value output timing, (No in step S7), the process goes to step S9.

On the other hand, when it is the partial average value output timing (Yes in step S7), the average value of the accumulated pixel values input in the past is respectively kept as a partial average value. For example, the average value of the accumulated pixel values of the 1st to 4th input pixel values is kept as a first partial average value, and the average value of the accumulated pixel values of the 1st to 8th input pixel values is kept as a second partial average value.

Next, whether the input pixel is the last pixel or not (whether all of the pixel values of the target light shielded pixels are processed or not) is judged (step S9). When the input pixel is not the last pixel (No in step 9), the processes after step S1 are continuously performed.

On the other hand, when the input pixel is the last pixel (Yes in step 9), an arithmetic process is performed (step S10). Herewith, a reference value of the black level may be obtained. The arithmetic process will be described below.

By the steps, the creation process of a reference value of the black level is finished. Note that the black clamp circuit 13 respectively calculates the difference between each pixel value input from the light receiving pixels and the created reference value of the black level to respectively output the calculated values to the next stage (post stage) circuit.

Figure 4:
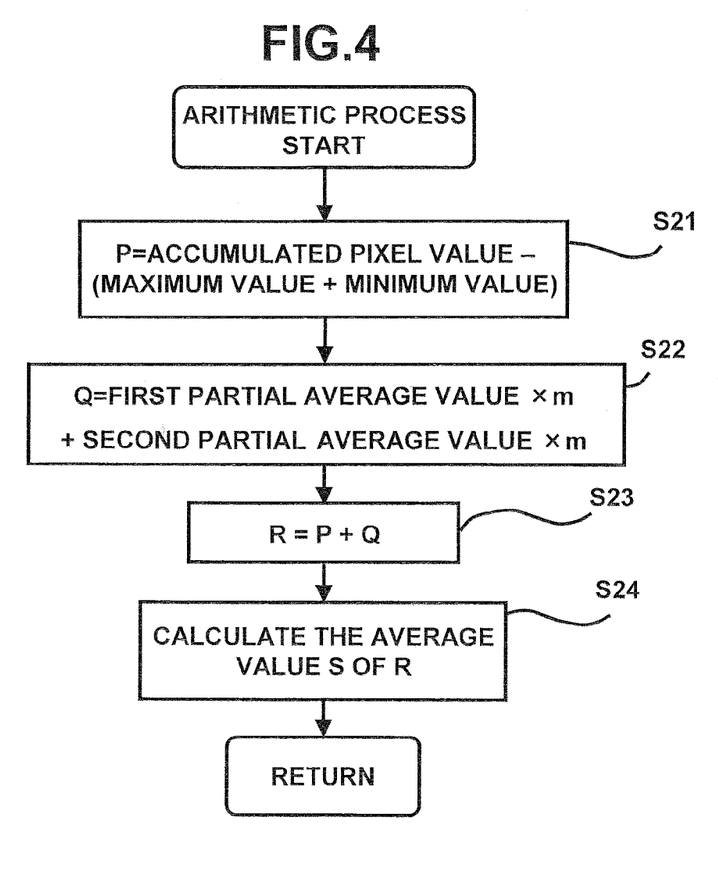
FIG. 4 is a flow chart showing an arithmetic process.

Next, the arithmetic process of step S10 will be described in detail.

FIG. 4 is a flow chart showing the arithmetic process.

First, the maximum value and/or the minimum value are/is subtracted from the accumulated pixel value of the all of the input pixel values (the value is referred to as accumulation value P) (step S21).

Next, the first partial average value and the second partial average are respectively multiplied by m (m=1, 2, 3 . . . ) to be added (the value is referred to as additional value Q) (step S22). The value of m is not specifically limited. However, it is preferable that the accumulated number of the pixel values obtained in the next step S23 becomes a value of a power of two.

Next, the accumulation value P and the additional value Q are added (the value is referred to as comparison accumulation value R) (step S23).

Next, the average value S of the comparison accumulation value R is calculated (step S24). The average value S becomes the reference value of the black level. Herewith, the arithmetic process is finished.

Next, the process will be described by using a concrete example.

Hereinafter, the reference pixel area 11b shall be equipped with 14 black pixels in one horizontal line.

Figure 5:
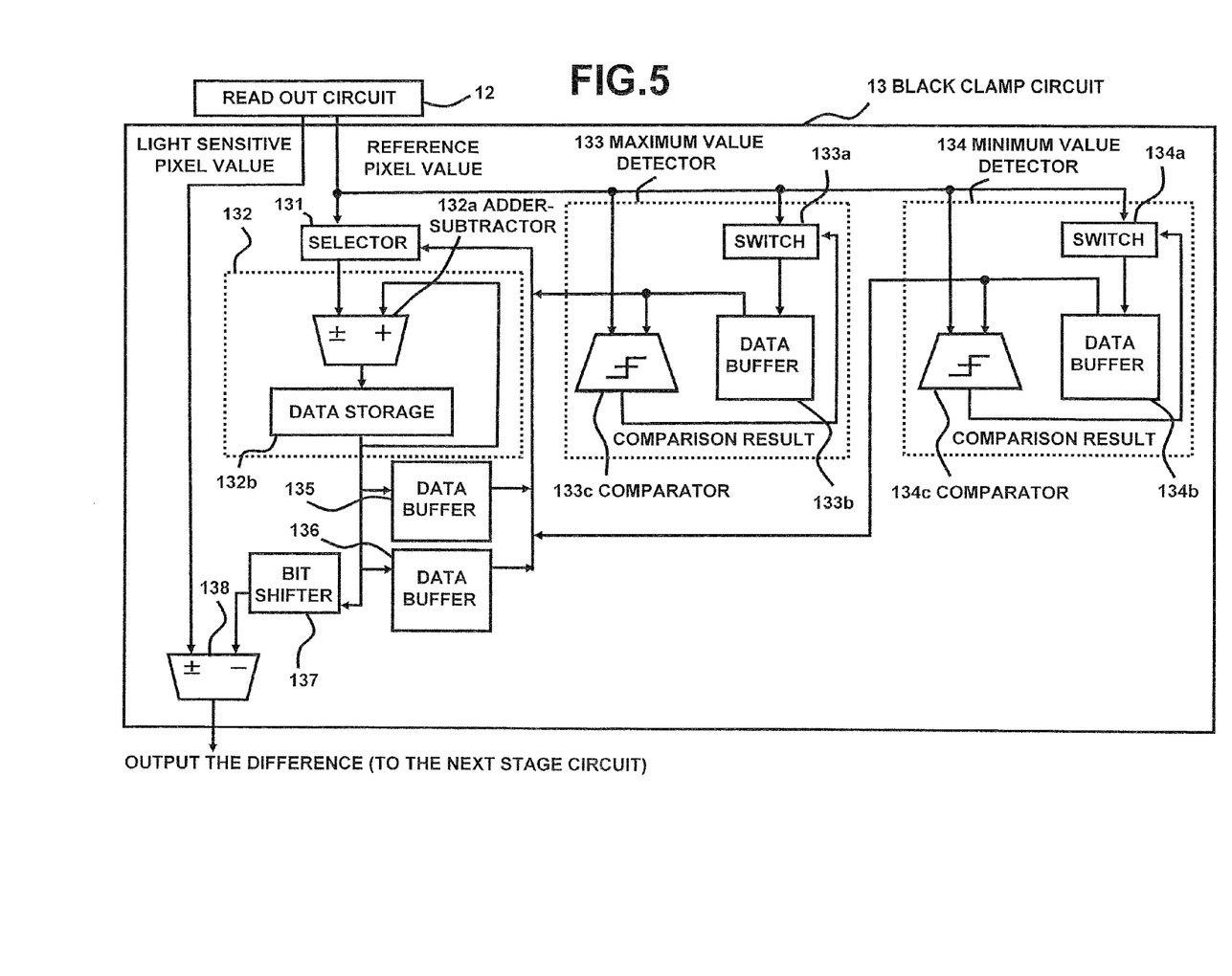
FIG. 5 is a diagram showing a structure of the black clamp circuit.

FIG. 5 is a diagram showing a structure of the black clamp circuit 13.

The black clamp circuit 13 includes a selector 131, an accumulator 132, a maximum value detector 133, a minimum value detector 134, data buffers 135, 136, a bit shifter 137, and a difference detector 138. Operational timing of each circuit is controlled by a timing signal from a timing generator.

The selector 131 selects one of the input pixel value of the reference pixel and the values respectively output from the maximum value detector 133, the minimum value detector 134, and the data buffers 135, 136.

The accumulator 132 includes an adder-subtractor 132a and a data storage 132b.

The adder-subtractor 132a performs addition or subtraction of the value selected by the selector 131 and the value stored in the data storage 132b to store the calculated result (accumulated pixel values) in the data storage 132b.

Further, the accumulator 132 outputs an accumulated pixel values (accumulated pixel values of the 1st to 4th input pixel values) stored in the data storage 132b to the data buffer 135 after the adder-subtractor 132a performs calculation by four times and outputs an accumulated pixel values (accumulated pixel values of the 1st to 8th input pixel values) stored in the data storage 132b to the data buffer 136 after the adder-subtractor 132a performs calculation by eight times.

The maximum value detector 133 includes a switch (selector) 133a, a data buffer 133b, and a comparator 133c.

The switch 133a stores the pixel value of the reference pixel input in the data buffer 133b when the value output from the comparator 133c is "1" (in accordance with the comparison result).

The comparator 133c compares the input pixel value of the reference pixel and the pixel value stored in the data buffer 133b. When the input pixel value of the reference pixel is larger, "1" is output to the switch 133a as the comparison result. On the other hand, when the input pixel value of the reference pixel is not more than the pixel value stored in the data buffer 133a, "0" is output to the switch 133a as the comparison result.

The minimum value detector 134 includes a switch (selector) 134a, a data buffer 134b, and a comparator 134c.

The switch 134a inputs the input pixel value of the reference pixel to the data buffer 134 when the value output form the comparator 134c is "1" (in accordance with the comparison result).

The comparator 134c compares the input pixel value of the reference pixel and the pixel value stored in the data buffer 134b. When the input pixel value of the reference pixel is smaller, "1" is output to the switch 134a as the comparison result. On the other hand, when the pixel value of the reference pixel is not less than the pixel value stored in the data buffer 134b, "0" is output to the switch 134a as the comparison result.

The data buffer 135 is constituted by, for example, a D-flip flop. The data buffer 135 reads out the accumulated pixel values of the 1st to 4th input pixel values stored in the data storage 132b, and creates and keeps the average value of the accumulated pixel values (first partial average value) by shifting the accumulated pixel values right by two bits (multiplying by ¼).

The data buffer 136 is constituted by, for example, a D-flip flop. The data buffer 136 reads out the accumulated pixel values of the 1st to 8th input pixel values stored in the data storage 132b, and creates and keeps the average value of the accumulated pixel values (second partial average value) by shifting the accumulated pixel values right by three bits (multiplying by ⅛).

The bit shifter 137 shifts the value output from the data storage 132b right by four bits (multiplies by 1/16) to output the value to the difference detector 138.

The difference detector 138 calculates the difference between the pixel value of the pixel and the data output from the bit shifter 137 to output the difference to the next stage circuit.

Hereinafter, the operation of the circuit will be described.

Accumulation is performed by the accumulator 132, detection of the maximum value is performed by the maximum value detector 133, and the detection of the minimum value is performed by the minimum value detector 134 for each time the pixel value of one reference pixel is input.

Herewith, when the pixel values of all of the reference pixels are output from the read-out circuit 12 (when all of the 14 pixels of one line are assembled), the accumulated pixel values of the pixel values of the 14 reference pixels is stored in the data storage 132b, and the maximum value and/or the minimum value of the pixel values of all of the 14 pixels is respectively stored in the data buffer 133b and the data buffer 134b. Further, the partial average value of four pixels is kept in the data buffer 135 and the partial average value of eight pixels is kept in the data buffer 136.

Then, the maximum value and the minimum value are selected by the selector 131 and the maximum value and the minimum value are subtracted from the accumulated pixel values of the 14 pixels.

In addition, the value obtained by shifting the average value kept by the data buffer 135 left by one bit (multiplying by two) is output from the data buffer 135, and the value obtained by shifting the average value kept by the data buffer 136 left by one bit (multiplying by two) is output from the data buffer 136.

Then, the two values respectively output from the data buffers 135, 136 are selected by the selector 131, and the accumulated pixel values of the 16 pixels obtained by adding the values is set as the final accumulated pixel values.

Then, the final average value (reference value of the black level) is calculated from the bit shifter 137. Then, a difference data between the final average value and a pixel value of the reference pixel (pixel value of the pixel after the black clamp) is created by the difference detector 138.

As described above, according to the imaging device 10, the maximum value is detected by the maximum value detector 133, and the minimum value is detected by the minimum value detector 134, and the maximum and/or minimum values are removed from the accumulated pixel values, and instead, complemented by using the partial average values. Accordingly, a stable average value may be obtained by a small number of black pixels. Further, only a small number of the reference pixels are required, so that the chip area may be reduced and the cost may be reduced.

Herein, the maximum value is detected by the maximum value detector 133 and the minimum value is detected by the minimum value detector 134. Accordingly, the maximum value and/or the minimum value may be found by one search (process) without sorting the pixel values of one row output from the read-out circuit 12. Further, the maximum and/or minimum values are replaced by using a partial average value, so that the final average value is not disturbed. Further, when creating the partial average value and the final accumulated pixel values, each of the values is created by intentionally accumulated pixel values by a power-of-two. Accordingly, even when the number of the reference pixels is not a breakpoint number (for example, a power-of-two or the like), the black clamp circuit 13 may perform calculation without having a divider. Accordingly, the size of the circuit may be reduced.

Note that in the embodiment, only the maximum value and/or the minimum value are removed. However, the embodiment is not limited to this and the second largest value and the second smallest value may be also removed in addition to the maximum value and the minimum value.

Further, in the embodiment, only the maximum value is to be stored in the data buffer 133b. However, the embodiment is not limited to this and the second largest value may be also stored. Then, the comparator 133c may compare the input pixel value of the reference pixel and the second largest value. Herewith, when all of the 14 pixels of one row are gathered, the maximum value and the second largest value are to be stored in the data buffer 133b (similarly, also in the minimum value detector 134). Then, by removing the values from the accumulated pixel values stored in the data storage 132b, a further stable average value may be obtained.

Note that, in the embodiment, in order to give a clear description, the example is shown in which the average value is once calculated and then, the value is multiplied by two. However, the embodiment is not limited to this, and for example, a value of an average value×2 may be crated by each of the data buffers 135, 136. That is, the data buffer 135 may create the value (average value of the 1st to 4th input pixel values×2) by shifting right by one bit, and the data buffer 136 may create the value (average value of the 1st to 8th input pixel values×2) by shifting right by two bits. Herewith the process for shifting left by one bit at the later step may be omitted.

Further, in the embodiment, the partial average value is calculated from the pixel values including the maximum value and/or the minimum value. However, the embodiment is not limited to this and the average value may be calculated from the pixel values from which the maximum value and/or the minimum value are removed. Herewith, a reference value of the black level which is more precise may be obtained.

The imaging device and the imaging method of the embodiment are described above based on the embodiment shown by the drawings. However, the embodiment is not limited to this and the structure of each unit may be substituted by any structure having the similar function. Further, any other component or process may be added to the embodiment.

Further, not less than any two structures (characteristics) among the above described embodiment may be combined in the embodiment.

Note that the application of the imaging device of the embodiment is not specifically limited and the imaging device may be used for, for example, a small size camera for a TV telephone and the like. According to the embodiment, a stable reference value of a black level may be created even when the number of the reference pixels is small by replacing the maximum value and/or the minimum value with the average value in the process for creating the reference value.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging device comprising:
    a plurality of light sensitive pixels for detecting light;
    a plurality of reference pixels shielded from light;
    an accumulator for accumulating pixel values obtained from the reference pixels;
    a detector for detecting a maximum value and/or a minimum value among the pixel values from the reference pixels;
    a substitutional value generator for generating a compensational pixel value which is substituted for the maximum value and/or the minimum value;
    a black level reference generator for generating a reference value of a black level by the accumulated pixel values for which the maximum values and/or minimum values has been replaced by the compensational pixel values; and
    an output compensator for compensating an output from the light sensitive pixels with the reference value of the black level.

2. The imaging device according to claim 1, the black level reference generator for generating the reference value of the black level by calculating the average value of the accumulated pixel values for which the maximum values and/or minimum values has been replaced by the compensational pixel values.

3. The imaging device according to claim 1, wherein the plurality of reference pixels are processed in pixel units of one horizontal line.

4. The imaging device according to claim 3, wherein the black level reference generator calculates a partial average value of a different number of a plurality of pixel values of reference pixels: and
    the substitutional value generator substitutes the maximum value and/or the minimum value with the partial average value.

5. The imaging device according to claim 3, wherein the substitutional value generator substitutes the partial average value for the accumulated pixel values, the partial average value being powers of two.

6. The imaging device according to claim 1, wherein the black level reference generator calculates partial average values among a number of pixel values of the plurality of reference pixels, the pixel values being powers of two.

7. The imaging device according to claim 1, wherein the compensational pixel value is an average value from pixel values of a predetermined number of reference pixels, or the value.

8. The imaging device according to claim 1, wherein the compensational pixel value is an average value from pixel values of a difference of reference pixels, the difference of the reference pixels being provided by subtracting powers of two of the reference pixels from a predetermined number of the reference pixels, and the powers of two of the reference pixels including the maximum values and/or minimum values of the pixel values of the predetermined number of reference pixels.

9. An imaging method for an imaging device having a plurality of light sensitive pixels for detecting light and a plurality of reference pixels shielded from light, the imaging method comprising:
    accumulating pixel values obtained from the reference pixels;
    detecting a maximum value and/or a minimum value among the pixel values from the reference pixels;
    generating a compensational pixel value which is substituted for the maximum value and/or the minimum value;
    generating a reference value of a black level by calculating an average value of the accumulated pixel values for which the maximum values and/or minimum values has been replaced by the compensational pixel values; and
    compensating an output from the light sensitive pixels with the reference value of the black level.

10. The method according to claim 9, wherein the compensational pixel value is an average value from pixel values of a predetermined number of reference pixels.

11. The method according to claim 9, wherein the compensational pixel value is an average value from pixel values of a predetermined number of reference pixels, or the value.

12. The method according to claim 9, wherein the compensational pixel value is an average value from pixel values of a difference of reference pixels, the difference of the reference pixels being provided by subtracting powers of two of the reference pixels from a predetermined number of the reference pixels, and the powers of two of the reference pixels including the maximum values and/or minimum values of the pixel values of the predetermined number of reference pixels.

\* \* \* \* \*